March 6, 1934.　　　　J. P. BENOIT　　　　1,950,077
BOTTLE HANDLING APPARATUS
Filed May 5, 1932　　　3 Sheets-Sheet 1
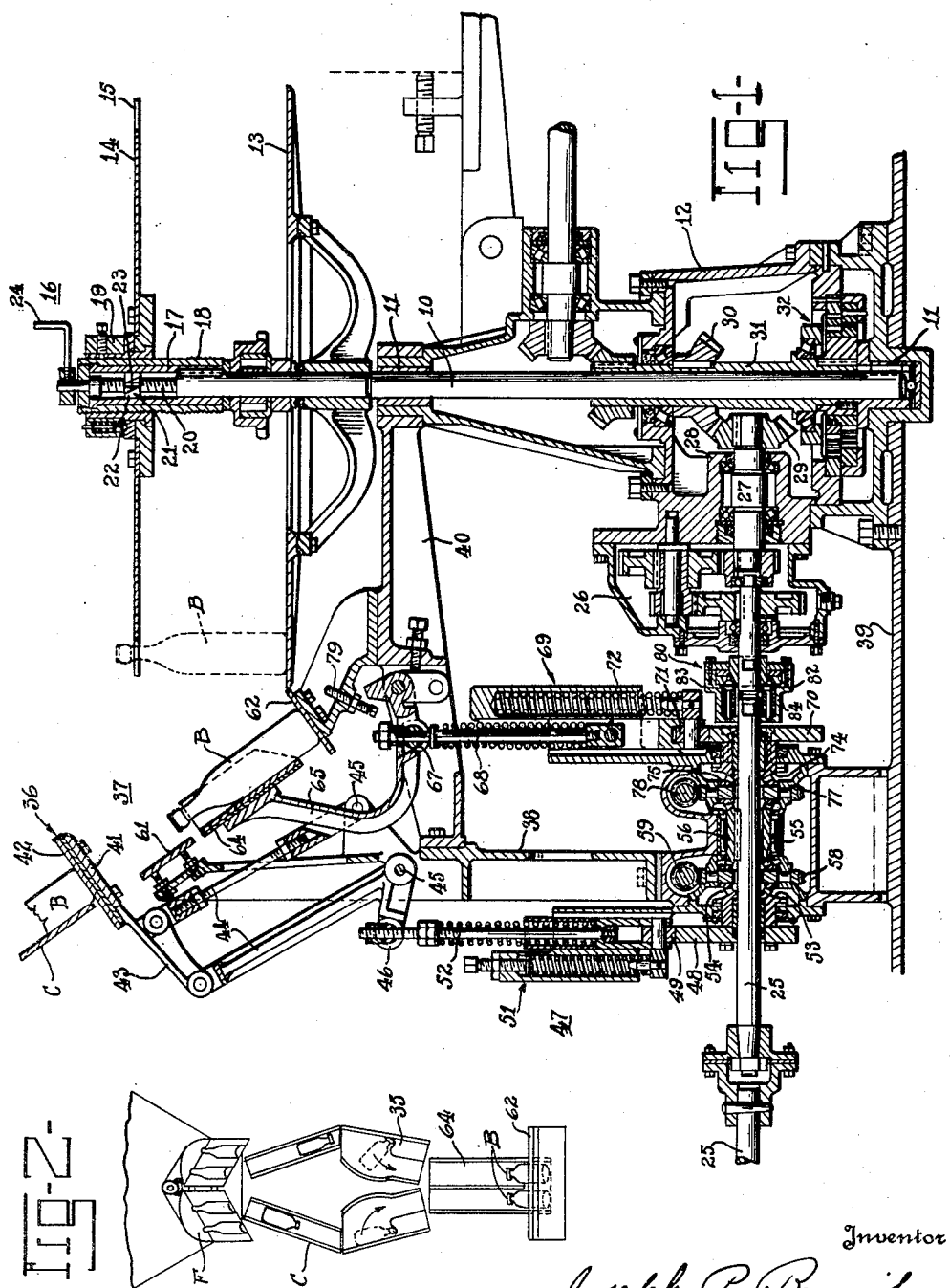

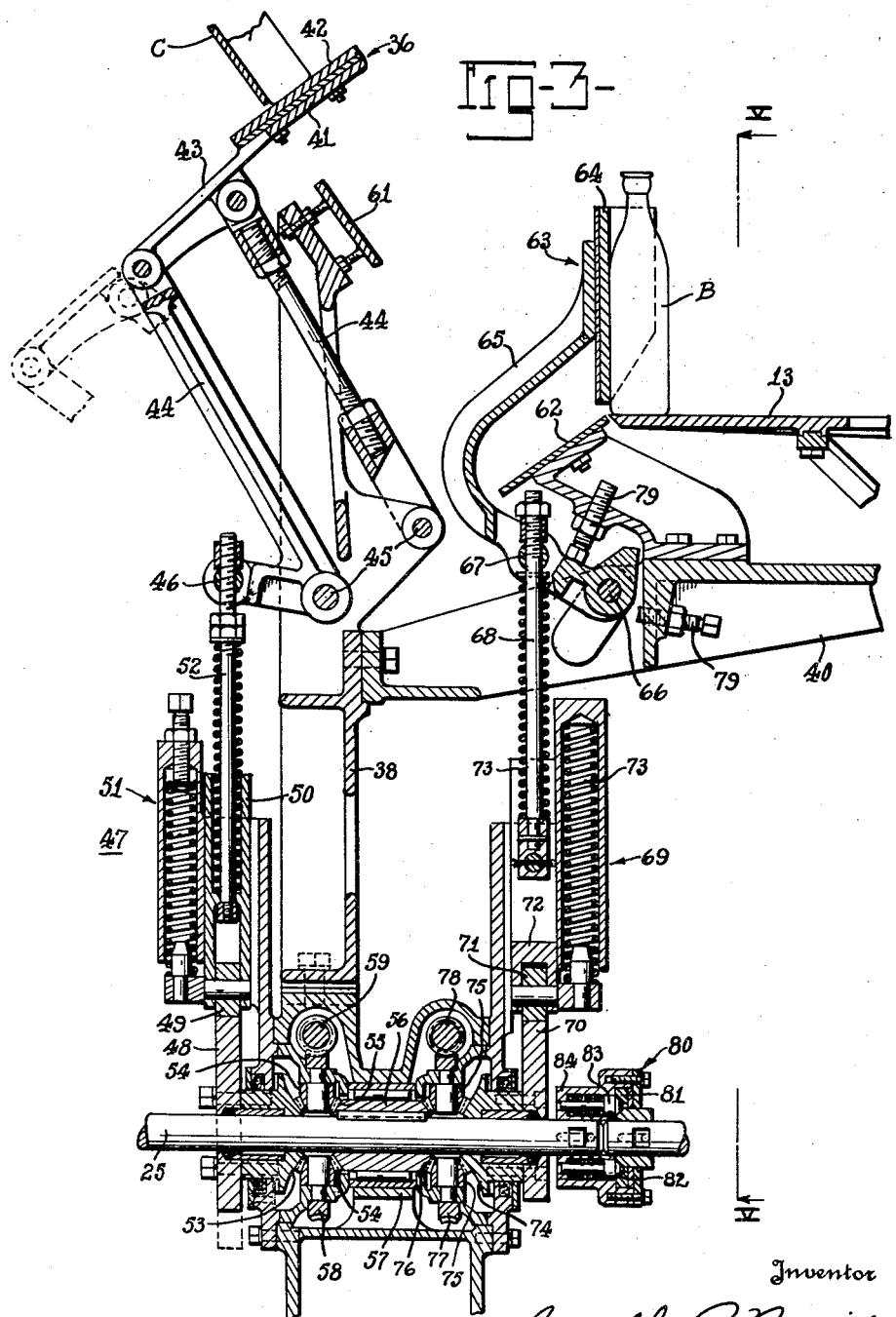

March 6, 1934.  J. P. BENOIT  1,950,077
BOTTLE HANDLING APPARATUS
Filed May 5, 1932   3 Sheets-Sheet 3
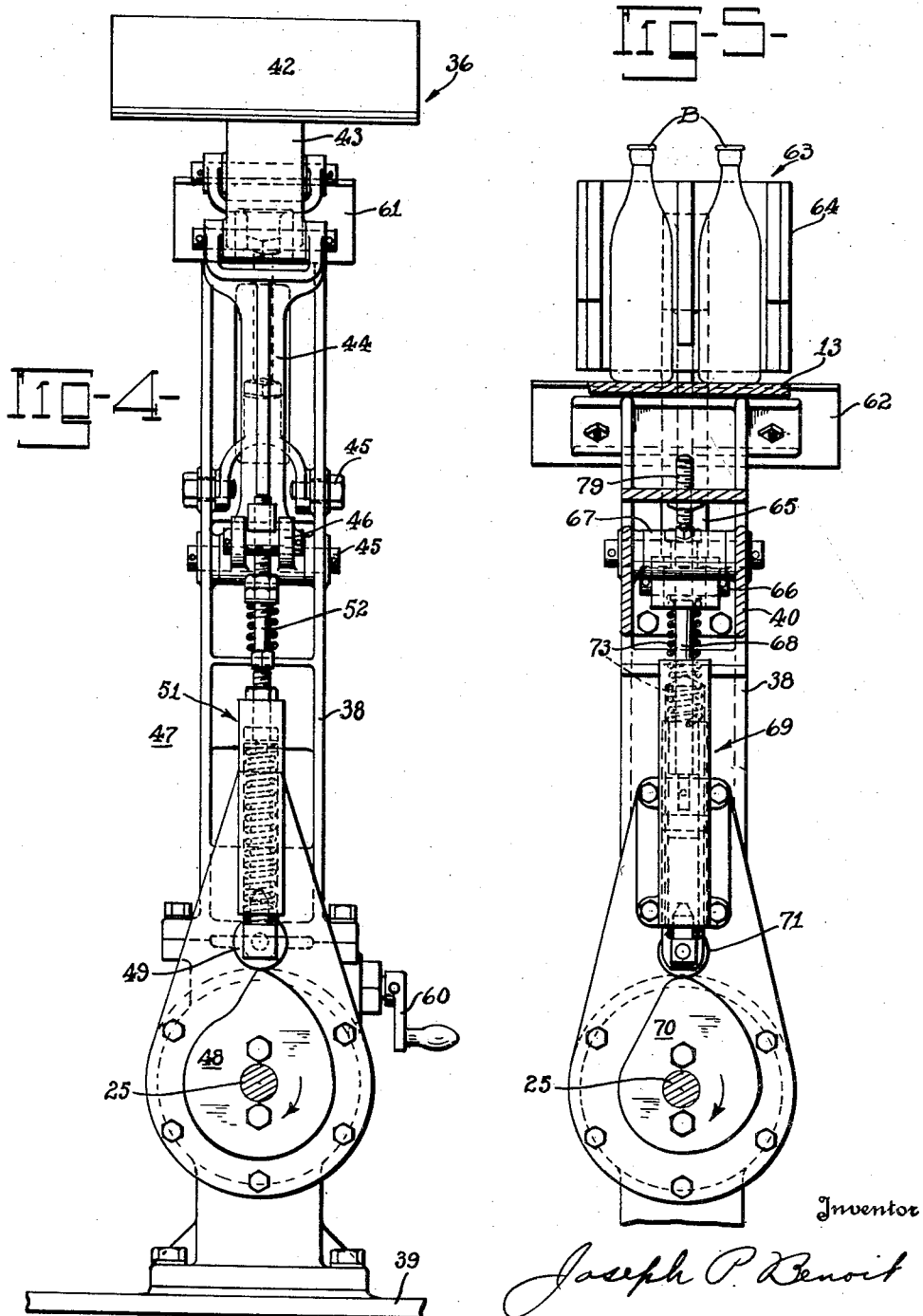

Patented Mar. 6, 1934

1,950,077

UNITED STATES PATENT OFFICE 1,950,077

BOTTLE HANDLING APPARATUS

Joseph P. Benoit, Alton, Ill., assignor to Owens-Illinois Glass Company, a corporation of Ohio Application May 5, 1932, Serial No. 609,448

10 Claims. (Cl. 198—27)

The present invention relates to improvements in bottle handling apparatus and more particularly means for receiving bottles or jars as they are discharged from a forming machine and placing them in upright positions upon a suitable support, the latter constituting part of means for transferring the articles to an annealing leer.

In the commercial production of glassware such, for example, as bottles and jars, it is customary to discharge the finished articles from the blow molds of a forming machine at a common discharge position or station. At this station the discharged articles are mechanically or manually placed upright upon a moving conveyor traveling in substantially the same horizontal plane as the leer conveyor upon which the articles are finally placed in order that they may be carried through the usual annealing leer. Under ideal operating conditions these articles are placed in front of and moved through the receiving opening of the leer in uniform spaced relation and at regular time intervals.

An object of the present invention is the provision of a novel and efficient apparatus designed to receive finished articles at the discharging position and place them upright in uniform spaced relation upon a horizontally disposed turntable or similar support.

Another object is the provision of a bottle handling apparatus the construction of which permits ready adjustment to accommodate articles of different sizes.

Other objects will be in part apparent and in part pointed out hereinafter.

In the drawings:

Fig. 1 is a vertical sectional elevational view of the invention.

Fig. 2 is a view diagrammatically illustrating the relation between the present invention and a conventional form of plural cavity blow mold at the discharging position.

Fig. 3 is a fragmentary sectional elevational view showing in detail the bottle handling apparatus.

Fig. 4 is an end elevational view taken from the left side of Fig. 3.

Fig. 5 is a sectional elevational view taken substantially along the line V—V of Fig. 3.

In the illustrated embodiment of the present invention, bottles B are discharged from the finishing molds F of a bottle blowing machine (not shown) and are moved by gravity down an inclined bottle chute C at the lower end of which they are temporarily supported preparatory to being transferred to a horizontally moving conveyor which carries the bottles to an annealing leer (not shown). The bottles or other articles enter the upper ends of the chutes neck first and by suitable means are inverted as they move downwardly so that at the lower ends of the chutes they occupy substantially upright positions.

The apparatus is made up of three separate units including, first, the combined bottle chute and inverting device which initially receives the bottles or other articles from the mold F, second, a rotary turntable, and third, a setting up unit which receives bottles ejected from the chute and places them upright and in uniform spaced relation upon the turntable. This turntable is associated with a suitable horizontal conveyor (not shown) upon which the bottles are supported and carried to an annealing leer (not shown). This general set up and turntable construction are illustrated in my United States Patent, Number 1,915,972, dated June 27, 1933, entitled Bottle transferring mechanism.

The turntable unit (Fig. 1) includes a rotary vertical shaft 10 which is journaled in vertically spaced bearings 11 provided at the upper and lower ends of a pedestal 12. The shaft extends above the upper bearing and supports a circular turntable 13 and steadying device 14, the latter consisting of a circular plate having an annular series of notches 15 in its periphery adapted to receive the neck portions of bottles while they are supported in upright positions on the turntable. The steadying device (Fig. 1) is so mounted upon the upper end of the shaft 10 that it may within certain limits be rotated independently of the turntable for the purpose of advancing or retarding the position of the notches 15 to insure accurate positioning of these notches at the transfer station as will be apparent presently.

A timer 16 (Fig. 1) is directly connected to the steadying device 14 for the purpose of adjusting it. The construction of the timer is disclosed in detail in the above identified United States Patent, and in more or less general terms includes an internal sleeve 17 secured to the upper end of the shaft 10 and disposed within an outer sleeve 18 which in turn is suitably connected to a hub 19 forming part of the steadying device 14. The internal sleeve 17 is provided with an opposed pair of spiral slots (not shown) extending lengthwise thereof while the outer sleeve 18 is provided with a pair of opposed straight slots or channels (not shown). An adjusting screw 20 disposed within the internal sleeve 17 carries a slide block 21 having radial arms 22 projecting into the spiral slots and fingers 23 on said arms extending through the spiral slots and projecting into the straight grooves or channels. By rotating the screw 20 the block 21 may be moved up or down with the result that the outer sleeve 18 and therefore the steadying device 14, will be given a rotary movement in one direction or another, about the axis of the shaft 10 and relative to the turntable 13. A handle 24 is attached to the upper end of the adjusting screw 20.

Rotation of the shaft 10 and with it the turntable and steadying device, is obtained by means of an electric motor or the like (not shown) operating through shafts 25 and a speed reduction gearing 26, the latter connected to a shaft 27 journaled in bearings 28 forming a part of the pedestal 12. A bevel gear 29 at the inner end of the shaft 27 meshes with a bevel gear 30 which is keyed to a sleeve 31 surrounding the lower portion of said shaft 10. The lower end of this sleeve 31 is suitably connected through reduction gearing 32 to the lower end of the shaft 10. Thus continuous rotation of the shaft 10 and parts supported thereon is obtained.

The bottle chutes C are individual to the mold cavities, each chute including upper and lower sections. The lower section is in the form of a bottle inverting device and includes a block 35 which engages the neck portions of bottles and inverts them. As a result, the bottles when positioned at the lower end of the chute or chutes, will have their neck ends extending upwardly and their base portions contacting with a movable gate 36 forming part of a setting up mechanism 37.

This setting up mechanism 37 is adapted to automatically handle the bottles or like articles in such a fashion that they are placed in upright positions and in uniform spaced relation upon the turntable 13, the neck portions of the bottles being disposed in the recesses 15 or notches, of the steadying device.

The construction of the setting up device may be substantially as follows: A main frame 38 is supported upon a base 39 and connected by a bar 40 to the upper end of the pedestal 12 which carries the turntable 13. The gate 36 referred to above includes a base plate 41 of any preferred shape, said plate having its upper surface covered by a sheet 42 of asbestos or similar fire resisting material. This gate normally closes the lower ends of the chutes C and is intended to temporarily support bottles B or like articles therein, preparatory to allowing them to move by gravity to the influence of the setting up device. In moving this gate from supporting engagement with the bottles it is caused to travel in a plane substantially at right angles to the longitudinal axes of the chutes. For this purpose the plate 41 is supported at the outer end of an arm 43 which is pivoted to the upper ends of a pair of parallel links 44, the lower ends of the latter being pivoted to hinge pins 45 on the frame 38. The lower of these parallel links 44 is provided with a short arm 46 having yielding connection with a cam mechanism 47 which will now be described, and functions to swing these links about their pivots at regular time intervals for the purpose of alternately retracting and projecting the gate 36. The upper link 44 is adjustable as to length in a very apparent manner for the purpose of changing the angular position of the gate 36 as may be required by the inclination of the chute or chutes C.

The cam mechanism 47 includes a rotary cam 48 (Figs. 1, 3, and 4) supported on one of the horizontal shafts 25 and a roller 49 riding upon the periphery of the cam 48 and supported upon the lower end of a vertical slide 50. This slide is connected through a spring device 51 including a push rod 52, to said arm 46. The cam 48 is bolted or otherwise secured to a bevel ring gear 53 which in turn has driving connection to the shaft 25 through a pair of diametrically opposed pinions 54 and a second ring gear 55. This second ring gear 55 is carried by a tubular shaft 56 which surrounds a portion of the shaft 25 and is keyed thereto. The tubular shaft 56 is journaled in a bearing 57. The pinions 54 are carried by a worm gear 58 meshing with a worm 59 which may be manually rotated when necessary by means of a removable handle 60 (Fig. 4). By rotating the worm 59 or adjusting screw which together with the pinions constitute a timer, the time of retraction and projection of the gate 36 may be advanced or retarded with respect to operation of other elements as will be apparent hereinafter.

Bottles released by retraction of the gate 36 move by gravity over a guide plate 61 and come to rest upon a stationary support 62 upon which they are held in inclined positions by a cradle 63. The stationary support 62 is fixed in an inclined plane substantially at right angles to the line of movement of the bottles from the chute C to said support. This support is separably attached to the bar 40 (Figs. 1 and 3) and has its upper margin disposed in proximity to the outer margin of the turntable 13 and in about the same horizontal plane. The cradle 63 which in addition to holding bottles upon the support 62, serves to transfer bottles from said support to the turntable, consists of trough-like members 64 individual to the mold cavities and suitably attached to a lever 65. This lever 65 is pivoted to a horizontal hinge pin 66 just below the stationary support 62 and connected through a hinge pin 67 and push rod 68 to a cam mechanism 69 which operates to swing the lever 65 about its pivot at regular time intervals. The cam mechanism 69 includes a rotary cam 70 and a cam roll 71 riding upon the periphery of the cam, said cam roll being carried by slides 72 which are connected through spring devices 73 to the push rod 68. Rotation of the cam 70 operates to move the cradle between the two extreme positions shown in Figs. 1 and 3. The cam 70 is mounted for rotation about one of the shafts 25 and is connected to a ring gear 74 meshing with a pair of pinions 75 which in turn mesh with a ring gear 76 carried by the tubular shaft 56. These pinions are mounted within a worm gear 77 which meshes with a worm 78 or adjusting screw. The pinions, worm gear, and worm or adjusting screw, together constitute a timer by means of which the swinging movements of the cradle 63 may be regulated and controlled. For the purpose of limiting the angle through which the cradle swings, a pair of adjustable stop screws 79 are provided, one being mounted on the bracket carrying the support 62 while the other is mounted on the bar 40.

In order that jamming of the setting up device will not affect continued normal operation of the other apparatus between said device and the leer, an automatic clutch 80 is employed in the provision of driving connection between the speed reduction gearing 26 and the adjacent horizontal shaft 25. This clutch includes a circular head 81 connected directly to a shaft forming part of the speed reduction gearing and having a series of recesses 82 therein providing seats for spring pressed plungers 83 which are suitably mounted in a head 84 on the adjacent shaft 25. Under normal operating conditions this clutch will provide effective driving connection between the setting-up device and other units. However, in the event the operating conditions become such that the shafts 25 and speed reduction gearing 26 should operate independently of each other, the plungers 83 will automatically move out of the recesses 82 and permit such operation.

It will be evident from the above that bottles discharged from a forming machine initially travel neck first down the chutes C and are inverted so that at the lower end of the chute they are supported neck up and in inclined positions upon the gate 36. At the proper moment the cam mechanism 47 (Figs. 1 and 3) operates to retract the gate allowing the bottles to move by gravity to the holding influence of the stationary support 62 and cradle 63. The cam mechanism 69 then operates to move the cradle from the position shown in Fig. 1 to that indicated in Fig. 2 with the result that the bottles are placed upright and in uniform spaced relation upon the turntable with their neck portions seated in the recesses 15 or notches of the steadying device. This turntable then carries the bottles part way around a circular path to a point at which they are transferred to a suitable conveyor (not shown) and thence to an annealing leer (not shown). As has been brought out heretofore, the adjustable stops 79 are intended for use in determining the angle through which the cradle is moved. The timers referred to heretofore in connection with the cam mechanisms 47 and 69, provide effective means whereby the timed relation between movement of the gate 36 and cradle 63 with respect to each other as well as operation of the associated devices, may be obtained.

Modifications may be resorted to within the spirit and scope of the appended claims.

What I claim is:

1. Bottle handling apparatus including an inclined bottle chute, a movable gate normally closing the lower end of the chute and forming a bottom therefor, a stationary bottle support disposed below and in parallel relation to the movable gate, a pivoted cradle disposed between the gate and support adapted to cooperate with the support in temporarily supporting bottles in an inclined position, a horizontal table arranged in proximity to the upper end of the stationary support, means for actuating the gate at regular time intervals to release bottles from the chute directly to the supporting influence of said support and cradle, and means for actuating the cradle to transfer bottles from the stationary support to upright positions on the table.

2. A bottle handling apparatus including an inclined bottle chute, a movable gate at the lower end of the chute, a stationary bottle support disposed below and in parallel relation to the gate, a pivoted cradle disposed between the support and gate adapted to cooperate with the support in temporarily supporting bottles in an inclined position, a horizontal table arranged in proximity to the upper end of the support, means for actuating the gate at regular time intervals to release bottles to the supporting influence of the stationary support and cradle, means for actuating the cradle to transfer bottles from the support to upright positions on the table, the mechanisms for actuating the gate and cradle each including a rotary cam, a pivoted lever, and a yielding connector between the cam and lever.

3. A bottle handling apparatus including an inclined bottle chute, a movable gate normally closing the lower end of the chute and cooperating with the latter in supporting the articles in an inclined position in said chute, a stationary bottle support below and parallel with said gate, a pivoted cradle arranged between the gate and support normally occupying a position in which its longitudinal axis is disposed at right angles to the upper surface of said gate and support, a turntable arranged in proximity to the upper end of the stationary support and mounted for movement in a horizontal plane, means for operating the gate at regular time intervals to release bottles to the supporting influence of the cradle and stationary support, and means for actuating the cradle to thereby transfer bottles from the stationary support to upright positions on the turntable.

4. A bottle handling apparatus including an inclined bottle chute, a movable gate normally closing the lower end of the chute and cooperating with the latter in supporting the articles in an inclined position in said chute, a stationary support below and parallel with the gate, a pivoted cradle arranged between the support and gate normally occupying a position in which its longitudinal axis is disposed at right angles to the upper surface of said gate and support, a turntable arranged in proximity to the upper end of the stationary support and mounted for movement in a horizontal plane, automatic means for operating the gate and cradle one at a time whereby bottles are delivered to the stationary support and cradle and afterwards placed in upright positions on the turntable, and means for changing the timed relation between operation of the gate and cradle.

5. Bottle handling apparatus including an inclined bottle chute, a movable gate normally closing the lower end of the chute, means for inverting bottles during movement down the chute to cause them to assume substantially upright positions upon the gate, a stationary support disposed in a plane below said gate, a pivoted cradle associated with said support, means for actuating the gate to thereby release bottles to the supporting influence of said cradle and stationary support, a horizontal turntable disposed in proximity to the upper margin of the stationary support, automatic means for swinging the cradle and thereby transferring bottles from the support to the turntable, and means for regulably controlling the angle through which the cradle is moved.

6. Bottle handling apparatus including an inclined bottle chute, a movable gate normally closing the lower end of the chute, means for inverting bottles during movement down the chute to cause them to assume substantially upright positions upon the gate, a stationary support disposed in a plane below said gate, a pivoted cradle associated with said support, means for actuating the gate to thereby release bottles to the supporting influence of said cradle and stationary support, a horizontal turntable disposed in proximity to the upper margin of the stationary support, automatic means for swinging the cradle and thereby transferring bottles from the support to the turntable, means for regulably controlling the angle through which the cradle is moved, said gate actuating and cradle moving means including a continuously rotating shaft, a pair of cams rotatably supported on said shaft, means operatively connecting the cams and shaft, means for adjusting the cams independently of each other about the axis of said shaft, and means whereby movement of the cams actuates the gate and cradle one at a time.

7. Bottle handling apparatus including an inclined bottle chute, a movable gate normally closing the lower end of the chute, means for inverting bottles during movement down the chute to cause them to assume substantially upright positions upon the gate, a stationary support disposed in a plane below said gate, a pivoted cradle associated with said support, means for actuating the gate to thereby release bottles to the supporting influence of said cradle and stationary support, a horizontal turntable disposed in proximity to the upper margin of the stationary support, automatic means for swinging the cradle and thereby transferring bottles from the support to the turntable, means for regulably controlling the angle through which the cradle is moved, said gate actuating and cradle moving means including a continuously rotating shaft, a pair of cams rotatably supported on said shaft, means operatively connecting the cams and shaft, means for adjusting the cams independently of each other about the axis of said shaft, cam rolls individual to the gate and cradle riding upon the cams, and means providing yielding connection between the cam rolls and said gate and cradle.

8. Bottle handling apparatus including a stationary inclined bottle chute, a gate movable into and out of the path of bottles falling out of the chute, said gate normally closing the lower end of the chute and adapted to support bottles in substantially upright positions in the latter, a stationary bottle support below said gate, a movable cradle associated with the support, a horizontal table in proximity to the stationary support, and means for actuating the gate and cradle whereby bottles are first released to the supporting influence of the stationary support and cradle directly from said inclined chute and thereafter moved by the cradle to an upright position on said table.

9. Bottle handling apparatus including an inclined bottle chute, a movable gate normally closing the lower end of the chute and adapted to support bottles in substantially upright positions at the lower end of the chute, a stationary bottle support below said gate, a movable cradle associated with the support, a horizontal table in proximity to the stationary support, means for actuating the gate and cradle whereby bottles are first released to the supporting influence of the stationary support and cradle and thereafter moved by the cradle to an upright position on said table, the means for actuating said gate including parallel links, cam mechanism operatively connected to one of the links, and means for changing the length of one link to thereby vary the direction of movement of the gate.

10. Bottle handling apparatus including an inclined bottle chute, a movable gate normally closing the lower end of the chute and adapted to support bottles in substantially upright positions, a stationary support below the gate and parallel therewith, a pivoted cradle associated with the support, a pair of continuously rotating cams mounted for movement about a common axis, means for adjusting the cams relative to each other about said axis, a cam roll riding upon each cam, and means providing yielding connection between the cam rolls and said gate and cradle.

JOSEPH P. BENOIT.